United States Patent [19]

Delic

[11] 3,761,019
[45] Sept. 25, 1973

[54] AUTO HUMIDIFIER AND STEAM INJECTION DEVICE

[76] Inventor: Miladin Delic, 3846 W. Wisconsin Ave., Milwaukee, Wis. 53208

[22] Filed: Mar. 2, 1972

[21] Appl. No.: 231,093

[52] U.S. Cl. ................. 237/12.3, 237/35, 123/25 B
[51] Int. Cl. ....... B60h 1/06, B60h 1/18, F02b 47/02
[58] Field of Search............. 123/25 B, 25 D, 25 P, 123/25 F, 25 A, 25 R; 126/19.5; 237/35

[56] References Cited
UNITED STATES PATENTS

| | | | |
|---|---|---|---|
| 1,697,843 | 1/1929 | Allen | 123/25 B X |
| 1,463,586 | 7/1923 | Kliesrath | 123/25 D |
| 1,739,749 | 12/1929 | Cabell | 123/25 B X |
| 2,112,972 | 4/1938 | Niethamer | 123/25 B X |
| 3,641,769 | 2/1972 | Vizza | 123/25 B X |

Primary Examiner—Albert W. Davis, Jr.
Assistant Examiner—Sheldon Richter
Attorney—Allan B. Wheeler

[57] ABSTRACT

A reservoir of water separate from the cooling system of an automobile is heated by waste heat from the engine in several ways. A coil connected to the top and bottom of the radiator supplies heat to the initial supply of water from the cooling system of the engine. A tank placed above and in contact with the exhaust manifold further heats the water by contact between the tank wall and the exhaust manifold. Final heating of the water into steam is accomplished by intimate contact between the exhaust manifold and the tube through which the heated water is flowing toward the point of delivery.

The steam thus produced is delivered to the air intake of the engine, either at the air cleaner or at the intake manifold. Provision is also made for delivery of the steam to the inside of the passenger compartment of the vehicle for humidification.

A pump is provided near the tank containing the initial supply of water, the pump preferably being controlled from the driver's position. Adjacent the pump is an on-off valve also controlled from the driver's position. Between the final heating coil and the two points of delivery of the steam is an apportioning valve which is not capable of being turned off, but which apportions the steam between the engine and the passenger compartment.

3 Claims, 1 Drawing Figure

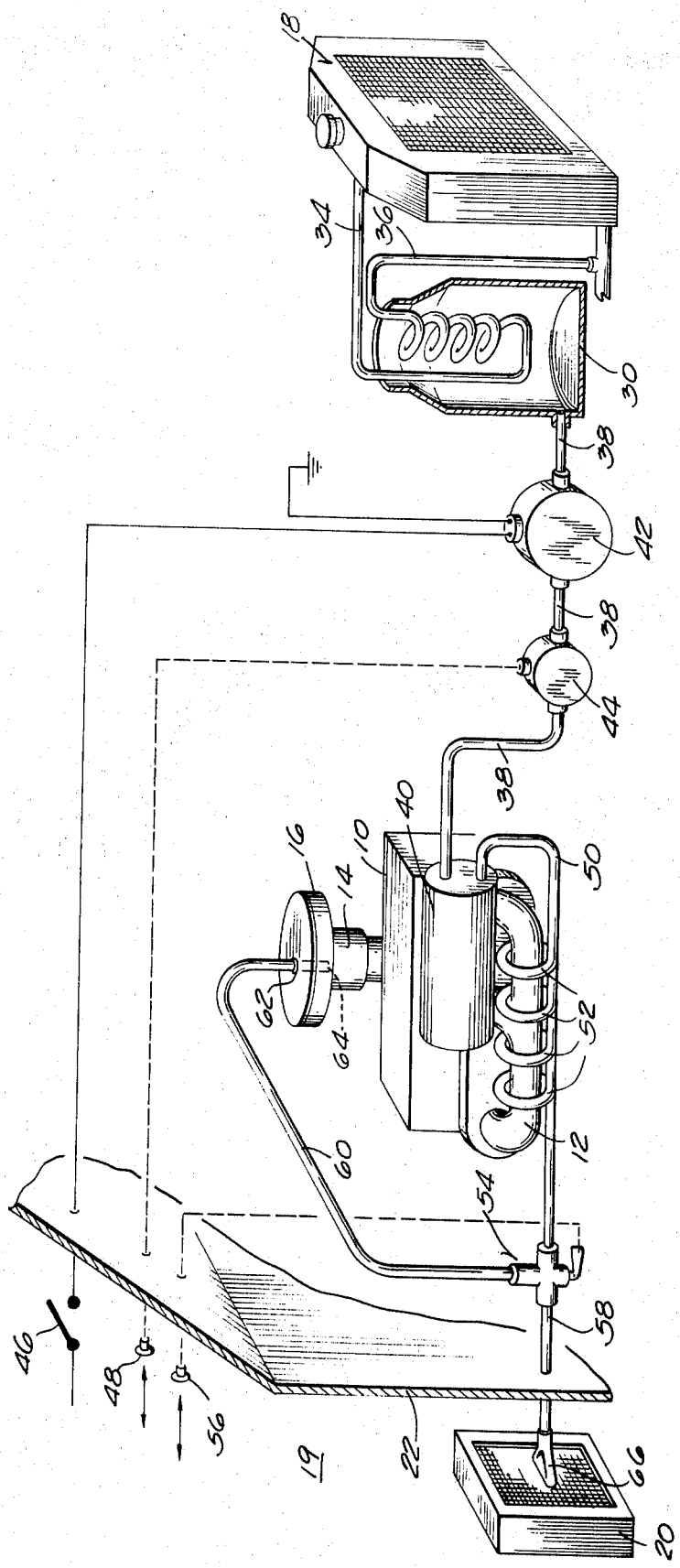

AUTO HUMIDIFIER AND STEAM INJECTION DEVICE

BACKGROUND OF THE INVENTION

It has long been known that the performance of vehicles is improved on days when the humidity is high. In accordance with that observation water has previously been supplied by various means to internal combustion engines along with the fuel and air. It is also known that at times when the outside air temperature is very low, the heating of the air to a comfortable temperature decreases the relative humidity of the air markedly. The decrease in humidity is uncomfortable in itself, and also increases the temperature to which the air must be heated to be comfortable. It is also known that where the relative humidity is naturally very low it may be desirable to increase the relative humidity for that reason alone, regardless of whether the air is also being heated. Both health and comfort are best served by keeping areas in which people are present at a humidity which is neither too high nor too low.

SUMMARY OF THE INVENTION

My invention consists of means for supplying steam, rather than water, to an internal combustion engine, it having been found that steam is much better adapted than liquid water to improve the performance of the engine with regard to power and smoothness; and to provide means for supplying steam to the passenger area of a vehicle in order to increase the relative humidity at will; to utilize only waste heat in raising the temperature of the water used for the above purposes to create steam, and to provide controls for the above purposes which are simple, reliable, and understandable.

DRAWINGS

The Drawing is a schematic representation of portions of a conventional internal combustion water-cooled power plant for a vehicle together with a schematic representation of the devices comprising my invention.

DESCRIPTION OF THE INVENTION

Athough the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

My invention is applied to a vehicle having a conventional internal combustion engine 10 provided with an exhaust manifold 12, a carburetor 14 having an air cleaner 16 and a radiator 18. Preferably the cab or operator's compartment 19 of the vehilce is provided with a smaller heater radiator 20 for the purpose of heating the compartment, the heater 20 being provided with the usual fan, air ducts, and controls. In general the engine compartment of the vehicle will be separated from the cab or passenger compartment by a fire wall or other wall 22.

In the device of my invention a tank 30 near radiator 18 is provided with a heating coil 32 connected at one end by pipe 34 to the top of radiator 18 and at the other end by pipe 36 to the bottom of radiator 18 so that the coolant circulating in radiator 18 will warm water placed in the tank 30 substantially to the temperature of the coolant which is also circulating through the engine by connections which are conventional and are not shown. Other methods of connecting heating coil 32 to the engine cooling system may be adopted. For instance, the connection may be so made that the water pump forces coolant through coil 32. Also the thermostat conventionally found in cooling systems may be bypassed so that coolant in the engine is circulated through coil 32 at times when flow through the radiator 18 is blocked by a thermostat. At all times the arrangement will be such as to extract enough heat from the coolant to bring the water in tank 30 substantially to coolant temperature without adversely affecting the performance of the cooling system or of the internal combustion engine 10.

Piping or passage 38 extends from tank 30 to a further tank 40. A pump 42 and a valve 44 respectively controlled by a switch 46 and a knob 48 in operator's compartment 19 control whether water can flow toward tank 40 in pipe 38, and how much.

Tank 40 rests in contact with exhaust manifold 12 and receives some heat from it, further raising the temperature of the water within tank 40. Pipe 50 continues the water passage and extends from tank 40 to valve 54. Pipe 50 includes coil turns 52 which are wrapped around exhuast manifold 12 in a manner which will depend on the shape of the manifold but which in any event is sufficient to transmit more than enough heat to turn water in coils 52 into steam.

Valve 54 is controlled from compartment 19 by a control knob 56 to apportion the flow of steam from coils 52 between passages respectively comprising pipe 58 and pipe 60. Valve 54 is of a type which is always capable of transmitting full flow but which may direct that flow all to pipe 60, all to pipe 58, or apportion the flow in any amounts between the two pipes 58 and 60. Pipe 60 extends to the top of the air cleaner 16 of the internal combustion engine 10 and is a sliding fit in a hole 62 in the top of cleaner 16. Any conventional means not shown may be used to seal against air leaks. Any conventional nozzle may be used to deliver the steam to the throat of the carburetor 14. If pipe 60 is a one-eighth inch tube, the nozzle 64 may be nothing more than the straight end of the tube.

Pipe 58 extends through the fire wall 22 of the compartment 19 and preferably ends in a flared nozzle 66 which may desirably be behind the heater core 20 so that the components associated with the heater such as a conventional fan and duct work (not shown) distribute the humidity delivered through nozzle 66 about the compartment 19.

In operation, when the engine 10 has been in use for a sufficient period to produce normal heat levels in the coolant and the exhaust manifold, the pump 42 may be started by closing the switch 46 and valve 44 may be opened to permit water to be pumped from tank 30 to tank 40. The water in tank 30 is already warmed by the coolant in coil 32 and is further heated in tank 40 by contact with manifold 12. Finally water flows through pipe 50 and coils 52, where sufficient heat is imparted to the water to turn it to steam. Valve 54 is adjusted by control 56 to apportion the flow of steam between nozzle 66 and nozzle 64 according to the degree of humidification required and the amount of steam to be injected in internal combustion engine 10. If necessary, valve 44 or pump 42 may be adjusted to increase or decrease the total flow.

I claim:

1. In a vehicle having a water-cooled internal combustion engine and a separate compartment for the operator, said engine having an exhaust manifold and means to supply fuel and air to the engine, the combination comprising a water supply tank, means to heat the water in the water supply tank by heat exchange with the coolant in the cooling system of the internal combustion engine, passage means from said tank having a portion in heat exchange relationship with said exhaust manifold to heat water from said supply tank to form steam, a pump between said supply tank and said passage means, means to add said steam to the fuel and air mixture for said internal combustion engine, means to supply said steam to the operator's compartment for humidification, a first variable valve in said passage means variable from a position shutting off the flow of water to a position in which maximum flow of water is permitted, said first valve being provided with means controlling the position of said valve from the operator's compartment, second valve means connected between said passage means, said means to add said steam to the fuel and air mixture for said internal combustion engine, and said means to supply steam to the operator's compartment, said second valve means being movable between a position in which all of the steam is directed to the means to add said steam to the fuel and air mixture and a position in which all of said steam is directed to said means to supply steam to the operator's compartment, intermediate positions of said second valve directing said steam to both said means to add said steam to the fuel and air mixture and to said means to supply said steam to the operator's compartment in proportion to the distance of said intermediate valve positions from the respective extreme valve positions, and means to control the position of said second valve from said operator's compartment.

2. The device of claim 1 further comprising a secondary tank between said supply tank and the portion of said passage means in heat exchange relationship with the exhaust manifold, said secondary tank being in contact with the exhaust manifold to receive heat therefrom.

3. The device of claim 1 further comprising means to control said pump operable from the operator's compartment.

* * * * *